United States Patent [19]

Logan

[11] Patent Number: 4,646,880
[45] Date of Patent: Mar. 3, 1987

[54] PLANETARY WHEEL END WITH WET BRAKE

[75] Inventor: Thomas W. Logan, Andover, Minn.

[73] Assignee: Dana Corporation, Toledo, Ohio

[21] Appl. No.: 802,927

[22] Filed: Nov. 29, 1985

[51] Int. Cl.⁴ ............................................. F16D 65/20
[52] U.S. Cl. .................................. 188/18 A; 74/489; 180/10; 188/352
[58] Field of Search ............. 180/10, 70.1; 188/18 A, 188/72.4, 352; 192/4 A; 74/411.5, 785, 786, 789

[56] References Cited

U.S. PATENT DOCUMENTS

| | | | |
|---|---|---|---|
| 3,377,076 | 4/1968 | Burnett | 188/196 P X |
| 3,754,625 | 8/1973 | Voth et al. | 192/4 A |
| 4,010,830 | 3/1977 | Logus et al. | 192/4 A |
| 4,037,694 | 7/1977 | Keese | 192/4 A |
| 4,142,615 | 3/1979 | Sidles et al. | 192/4 A |
| 4,160,497 | 7/1979 | Galicher | 192/4 A |
| 4,317,498 | 3/1982 | Jirousek et al. | 180/70.1 |
| 4,407,382 | 10/1983 | Dziuba et al. | 180/10 |
| 4,461,373 | 7/1984 | Pratt et al. | 192/4 A |

Primary Examiner—Duane A. Reger
Attorney, Agent, or Firm—Robert M. Leonardi; Norb A. Heban

[57] ABSTRACT

An axle outer end is disclosed including a planetary reduction drive unit and a multiple disc friction brake. The friction brake includes a plurality of rotatable and non-rotatable discs for selectively interconnecting the ring and sun gears of the planetary drive unit. The friction brake also includes a piston for engaging and moving the discs into frictional contact with the planetary drive unit carrier to restrain rotation of the sun gear and output member. The piston is contained in a chamber formed by a portion of the planetary drive unit ring gear and a portion of an adapter secured to the outer end of a non-rotatable spindle. An improved oil circulation system is incorporated in the axle outer end to supply oil to the disc stack and permit the oil to return the main oil sump.

16 Claims, 5 Drawing Figures

PLANETARY WHEEL END WITH WET BRAKE

BACKGROUND OF THE INVENTION

This invention relates to drive axle outer end assemblies in general and is more particularly directed to a multiple disc friction brake and planetary reduction drive unit for such assemblies.

Planetary reduction outer ends are used as the final drive in axles for many heavy duty, off-highway type vehicles which are employed in the construction, logging and mining industries, as well as in farming and for mobile materials handling equipment and heavy industrial machinery. As in conventional vehicles, brake mechanisms are associated with the drive axle outer end to restrain rotation of the final drive mechanism and the wheel or sprocket driven by the drive axle outer end.

In such drive axles, the multiple disc friction brake is arranged to restrain rotation of a differential shaft input to a planetary gear reduction provided in the differential housing. In certain applications the multiple disc friction brakes engage the input shaft to the planetary reduction upstream of the shaft input to the reduction gearing. These brakes will therefore not restrain rotation of the reduction gearing for the output member driven by that gearing if the axle or input shaft breaks between the rotor friction discs and the input to the planetary reduction gearing.

The failure of a drive shaft, whether it be an axle shaft serving as an input to the final drive or a stub shaft directly driving an output member, is not an uncommon occurrence in drive axles for heavy duty equipment. It is therefore advantageous to have the brake mechanisms provided to such drive axles operative on the final reduction gearing and the output member independently of the input shaft and any shaft drive connecting the reduction gearing to the output member.

Self-contained final drive systems for axle outer ends are known where a wheel hub is driven by a planetary gear reduction unit and the multiple disc friction brake is used to stop rotation of a sun gear. In addition, certain systems are known where the multiple disc friction brakes are positioned to act directly between the ring and sun gears of the planetary gear reduction unit and the brake discs are arranged to apply a braking force directly to the carrier of the planetary gear reduction unit.

In self-contained final drive units of the above type, cooling of the multiple disc friction brake also poses a constant problem. The problem results from insufficient circulation of oil to and from the disc pack. Since the oil in such systems absorbs most of the heat energy from the discs in the pack, it will apparent that if only a small volume of oil is permitted to circulate to and from the disc pack, a serious heat problem could arise.

While the known systems operate satisfactorily in some applications, they are complex, requiring a plurality of parts, lacking in adequate cooling and also requiring much more space than is available in existing systems.

SUMMARY OF THE INVENTION

The present invention provides a final drive and brake assembly for an axle outer end comprised of an axle shaft, an axle housing, an output member rotatably mounted on the housing, and a plurality of rotary elements comprising a power train drive connecting the axle shaft to the output member internally of the output member. The brake mechanism is a multiple disc friction brake comprised of a plurality of axially movable brake discs carried internally of the output member. Alternate discs are fixed against rotation relative to the axle housing. Intermediate discs are non-rotatably secured to one of the rotary elements downstream of the axle shaft in the power train drive connecting the axle shaft to the output member. Actuating means are provided to move the brake discs axially toward a surface on the planetary reduction unit and into frictional contact with one another thereby restraining rotation of the one rotary element and the output member.

In the present invention, the disc brake assembly applies an axial load directly to the planetary carrier, and a radial load directly to the planetary sun gear from the ring gear, i.e., radial loads are transmitted from the brake discs to the planetary drive unit gearing with no intermediate components. In a preferred embodiment, the disc brake actuator piston is situated in a two-part pressure chamber formed by the planetary ring gear and an adapter secured to the wheel spindle. Suitable passages in the adapter and spindle cooperate to supply and exhaust pressure from the two-part pressure chamber for moving the piston toward and away from contact with the brake discs. Piston sealing rings are provided in the pressure chamber which are operative to function as return means for assisting in partially moving the piston to its disengaged position when engaging pressure is relieved.

None of the known systems discloses or suggests the use of an adapter secured to the spindle where a portion of a one-piece ring gear and adapter cooperate to form a piston receiving chamber.

The present invention thus provides a multiple disc friction brake mechanism which is operative on the power train connecting the axle shaft and the output member downstream of the axle shaft input to the power train and operates independently of the axle shaft per se.

In a preferred form the present invention also provides a self-contained final drive and brake assembly for an axle outer end in which a wheel hub is driven by a planetary gear carrier and the multiple disc friction brake is directly operative on the gear driving the planetary pinions. In this embodiment, the multiple disc friction brake is operative to restrain rotation of the planetary reduction drive and the output member independently of any torque transmitting drive shafts.

In the preferred form of the invention to be described more fully herebelow the final drive and brake assembly are compactly provided internally of a wheel hub in a chamber in which the elements drive connecting the axle shaft and the wheel hub, the wheel hub bearings and the multiple disc friction brake assembly are subject to the cooling and lubricating action of a common pool of lubricant. The foregoing and other advantages offered by the final drive and brake assembly of the present invention will become more evident from the following description of the accompanying drawings.

DESCRIPTION OF THE PREFERRED EMBODIMENT

Figure 1:
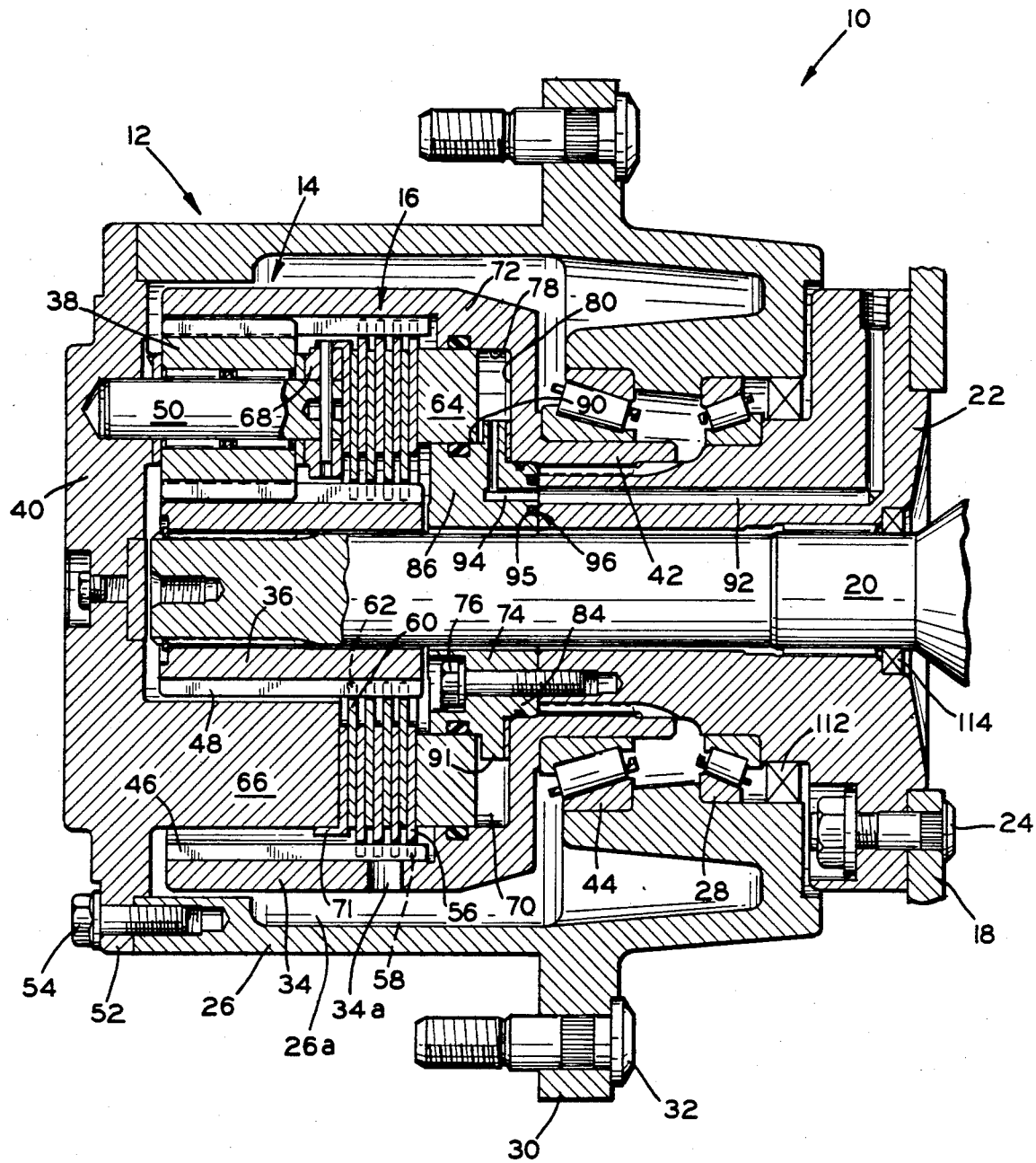
FIG. 1 is a fragmentary partially sectioned view of a drive axle outer end embodying the final drive and brake assembly of the present invention.
Figure 2:
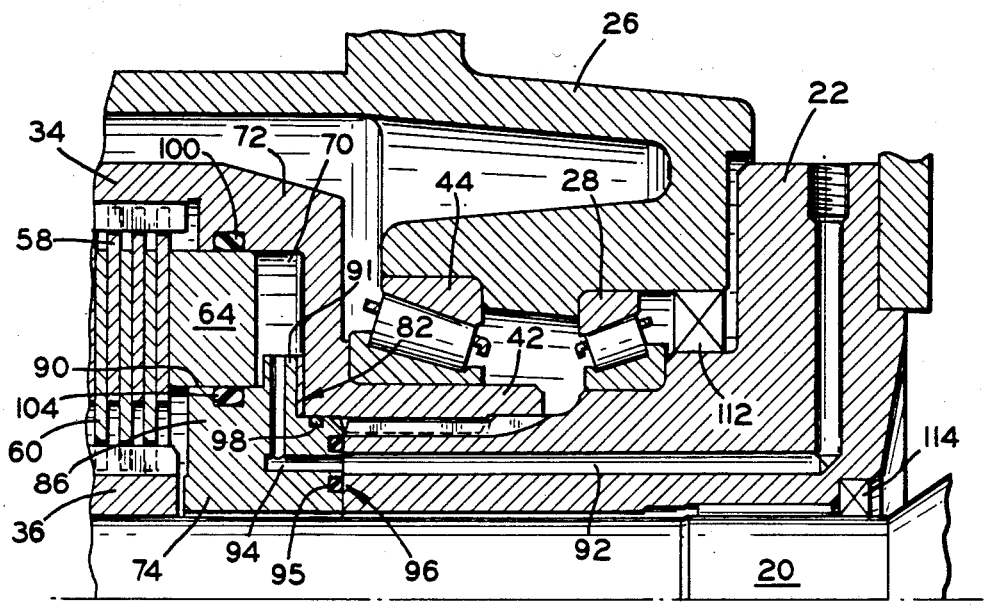
FIG. 2 is an enlarged sectional view of a portion of the drive axle outer end of FIG. 1 showing the hydraulic inlet and exhaust passages.

Referring to FIG. 1, a portion of a drive axle is shown generally at 10. Each end of drive axle 10 is provided with an outer end assembly 12, including a planetary drive unit 14 and a multiple disc friction brake 16. Drive axle 10 has a stationary axle housing 18 containing a differentially connected rotatable axle shaft 20. An axially outwardly extending spindle 22 having a central opening is non-rotatably secured to the end of axle housing 18 in surrounding relation to axle shaft 20 by a plurality of circumferentially spaced bolts 24.

Axle shaft 20 is positioned in the spindle central opening and serves as an input member for planetary drive unit 14. Outer end assembly 12 includes a wheel hub 26 which serves as an output member. Wheel hub 26 has an inner end rotatably mounted on spindle 22 by an inboard wheel bearing 28 and an open outer end forming an annular cavity. An annular radially outwardly extending flange 30 is integrally formed on an intermediate portion of wheel hub 26 for attachment to a wheel rim (not shown) in a conventional manner by bolts 32. The output member or wheel hub 26 is adapted to surround the input member or axle shaft 20.

In the preferred embodiment planetary gear unit 14 operably connects the input and output members and includes a stationary one piece ring gear 34, an axially elongated sun gear 36, a plurality of pinion gears 38 and a carrier 40. Ring gear 34 has an internally splined hub 42 connected to spindle 22 and rotatably supports wheel hub 26 thereon by means of an outboard bearing 44. Sun gear 36 is non-rotatably mounted and axially retained on the outer free end of axle shaft 20. Ring gear 34 is provided with longitudinally extending internal teeth 46 of a length substantially equal to and radially aligned with longitudinally extending external teeth 48 provided on sun gear 36. Pinion gears 38 are rotatably mounted on pins 50 extending between and fixed to opposed walls of carrier 40. Pinion gears 38 have external teeth positioned for meshing engagement with the outer portions of ring gear internal teeth 46 and sun gear external teeth 48. Planet carrier 40 has an annular radial flange 52 secured to the open end of wheel hub 32 by bolts 54.

Multiple disc friction brake 16 is positioned internally of wheel hub 26 and is operable to directly connect ring gear 34 and an axially elongated sun gear 36. Brake 16 includes a disc stack comprising a first plurality of axially movable non-rotatable or stationary discs 56 having external teeth 58 engaging the inner portion of ring gear internal teeth 46 and a second plurality of axially movable rotatable discs 60 interleaved with discs 56 having internal teeth 62 engaging the inner portion of sun gear external teeth 48. Disc teeth 58 and 62 are slightly smaller than the spaces between respective mating ring and sun gear teeth 46 and 48 to permit brake discs 56 and 58 to move axially relative to their supporting members.

Friction brake 16 is hydraulically actuated by an annular piston 64 which is axially aligned with circumferentially spaced internal surfaces providing an inwardly extending projection 66 and pin supporting bosses 68 which are an integral part of carrier 40. An annular reaction plate 71 is secured to the internal faces of projections 66 and/or bosses 68 to provide a friction engaging surface for discs 56 and 60 when piston 64 is moved to its engaged position.

Figure 4:
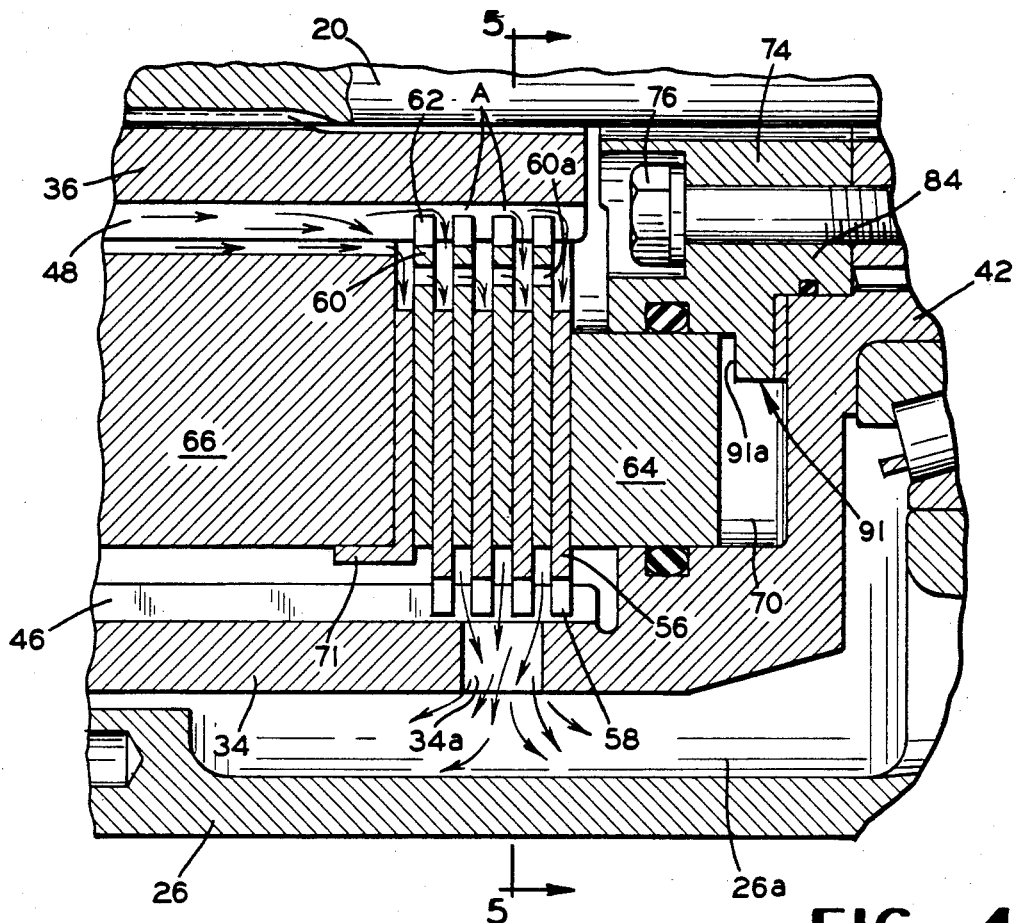
FIG. 4 is an enlarged fragmentary sectioned view of a lower portion of the drive axle outer end of FIG. 1 showing the cooling path.

Piston 64 is disposed in an annular chamber 70 formed by a radial wall 72 on ring gear 34 and an adapter ring 74 which is connected to the outer end of spindle 20 by bolts 76. In the preferred embodiment, a stepped internal recess is provided in ring gear radial wall 72 defining an annular axially extending outer wall 78 and a radially extending inner wall 80. Adapter ring 74 surrounds axle shaft 20 and has a stepped recess 82 forming an internally reduced diameter hub 84 which is piloted in the bore of ring gear hub 42 and an enlarged diameter rim 86. Adapter rim 86 is located in the ring gear recess to provide an axially extending outer peripheral wall 90 which is radially spaced from and parallel to recess wall 78. Thus, ring gear recess walls 78, 80 and adapter wall 90 constitute annular chamber 70 for slidably receiving piston 64. Means are provided to limit release travel of piston 64 in chamber 70. To accomplish this, rim 86 of adapter ring 74 is constructed with an intermediate integral radially outwardly extending annular rim 91. As best seen in FIG. 4, rim 91 extends into chamber 70 and defines an annular radial inner face 91a. When piston 64 is in the engaged position as shown, adapter rim face 91a is normally spaced a predetermined distance from the backside of piston 64. In the exhausted position, piston 64 shifts to the right and is limited in its travel as the piston inner face moves into contact with rim face 91a.

Hydraulic fluid under pressure is supplied to and exhausted from chamber 70 from a suitable source through first fluid passages 92 in spindle 22 and 94 in adapter ring 74. In the preferred embodiment, the opposed inner faces of spindle 22 and adapter ring 74 are disposed in abutting relation. An annular groove 95 is provided in the adapter inner face surrounding the outlet end of passage 94 for receiving sealing means in the form of an O-ring seal 96 to prevent leakage between connecting passages 92 and 94. Alternately, groove 95 and seal 96 may be located in the spindle inner face. A seal 98 is also provided between the pilot connection of the adapter ring reduced diameter hub 84 and mating bore in ring gear hub 42 to function as sealing means to prevent hydraulic fluid leakage along the piloted surfaces.

Sealing means are also provided in piston chamber 70 for sealing hydraulic fluid in the chamber. The sealing means is also adapted to function as means for partially returning piston 64 to its normally released position when hydraulic pressure is released from chamber 70. The sealing means comprises an outer annular sealing ring 100 disposed in a circumferentially extending groove 102 provided in ring gear recess inner axial wall 78 and an inner annular sealing ring 104 disposed in a circumferentially extending groove 105 provided in the adapter outer wall 90. Sealing rings 100 and 104 engage the piston inner and outer walls to prevent hydraulic fluid leakage outwardly along the piston side walls and prevent lubricant from entering the hydraulic fluid system. Sealing rings 100 and 104 serve an additional purpose in that they are also designed to function as return means to assist in urging piston 64 back into chamber 70 when engaging pressure is released. In this situation, when pressure is supplied to chamber 70 through spindle and adapter passages 92, 94, piston 64 is urged outwardly with its inner and outer surfaces causing sealing rings 100 and 104 to roll-over and deform thereby assuming a resiliently loaded or cocked condition. When pressure is exhausted from chamber 70, sealing rings 100 and 104 tend to spring back to their original shape thus applying a force which tends to aid piston 64 in moving inwardly toward to its released position.

Figure 3:
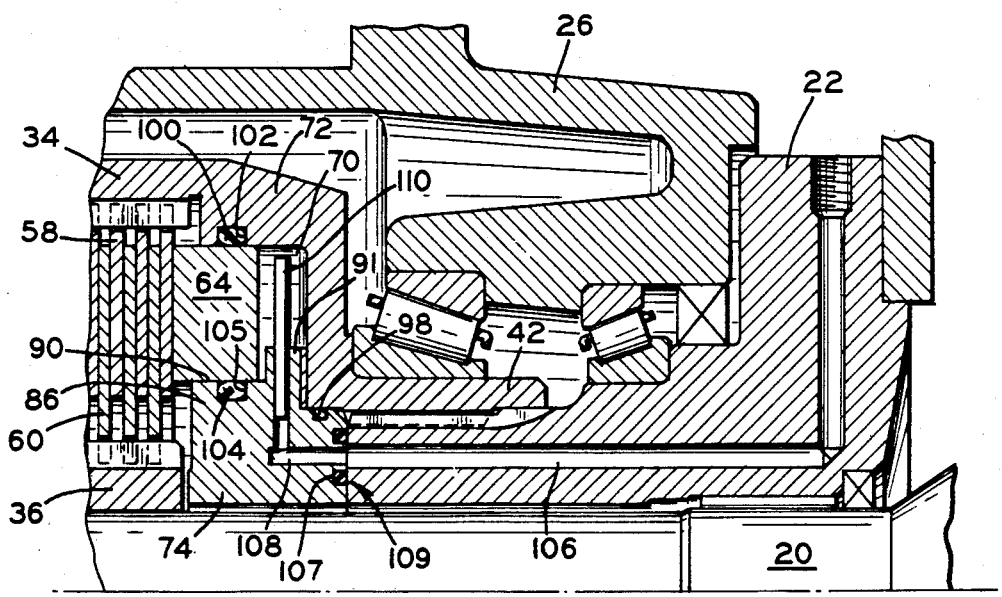
FIG. 3 is another enlarged sectional view similar to FIG. 2 showing hydraulic passages for initially bleeding air from the system.

As seen in FIG. 3, means is provided to initially bleed air from piston chamber 70 during installation. This means takes the form of second passages including a passage 106 in spindle 22 and mating passage 108 in adapter ring 74. To prevent leakage between connecting passages 106 and 108, an annular groove 107 is provided in the end face of adapter ring 74 surrounding the outlet end of passage 108 for receiving an o-ring 109. A bleed tube 110 is secured in adapter passage 108 and projects radially outwardly toward the top of piston chamber 70. Tube 110 has its free end spaced a selected distance from ring gear axial wall 78 so as to function as an inlet means for bleeding air from the system through spindle and adapter passages 106, 108.

Figure 5:
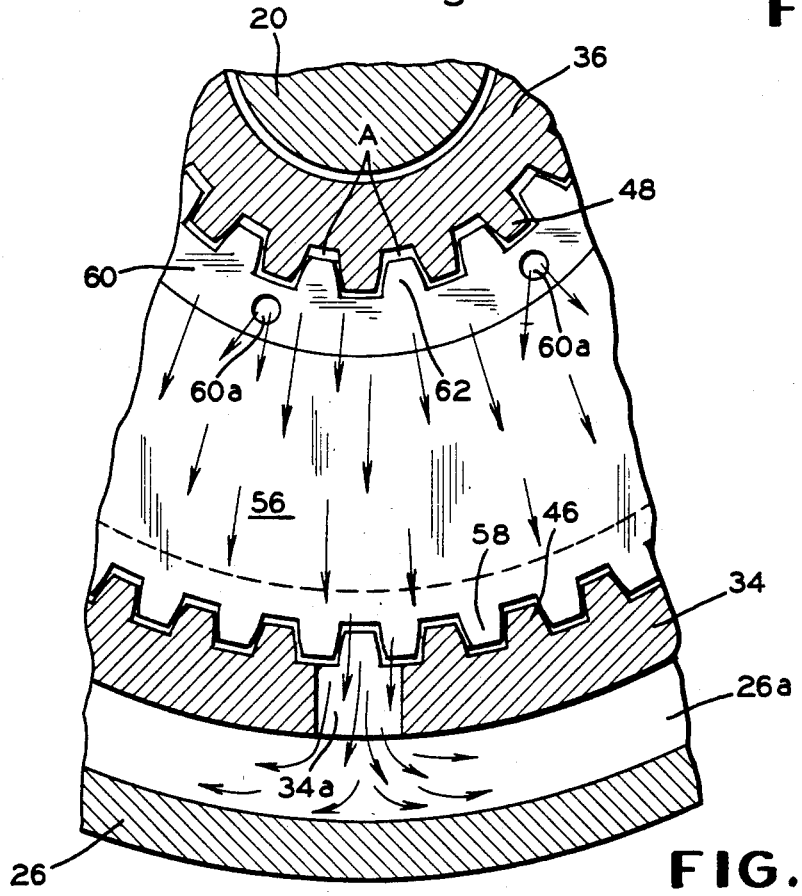
FIG. 5 is a sectional view taken along Line 5—5 of FIG. 4.

The oil circulation system of the present invention is disclosed in detail in FIGS. 4 and 5. The purpose of the oil circulation system is to maintain a suitable supply of oil in the plate stack, i.e., stationary and rotatable discs 56, 60 respectively. In this system, oil is intended to receive heat energy absorbed in discs 56, 60 during a braking cycle. This oil is then cooled by leaving the plate stack and mixing with the rest of the oil in a sump 26a. As the temperature of the entire volume of oil rises, heat is transferred to the castings and then to the environment. Means are provided in axle outer end assembly 12 between sun gear 36 and rotatable discs 60 to provide a sufficient circulation path for oil to flow from between the meshing gear teeth of sun gear 36 and mating planet pinion gears 38 to sump 26a. In the preferred embodiment, the circulation path defines an axial oil flow path for receiving oil from between the meshing sun and planet gear teeth. This is accomplished by removing material at the top land portion of each tooth 62 on rotatable discs 60. In addition, this means further includes a plurality of circumferentially spaced openings 60a provided in each disc 60 radially outwardly of disc teeth 62. Additional means are provided on ring gear 34 for receiving oil from between stationary and rotatable discs 56,60 and directing the oil to sump 26a. This means includes an outlet opening 34a provided at the base of ring gear 34.

Referring to FIG. 5, it will be seen that by removing the top land portions of disc teeth 62, enlarged passages or spaces A result between the top lands of teeth 62 and bottom lands of mating sun gear teeth 48. Alternately, passages A could be established by removing portions of the bottom lands of sun gear teeth 48 without altering disc teeth 62 or removing portions at both lands. A further alternative would be to remove one or more of the sun gear teeth 48 or aligned disc teeth 62.

As best seen in FIG. 4, disc openings 60a are axially aligned to provide a straight axial flow path through discs 60 and outlet opening 34a is provided at the bottom of stationary ring gear 34 and centrally positioned with respect to the plate stack. In operation, meshing sun gear 36 and pinion gears 38 act as a gear pump forcing oil to move out of the meshing gear teeth and move to the left and right of the gears. The oil moving to the right of the gears will pass through enlarged spaces A, flow radially outwardly into disk openings 60a, through discs 56, 60 and exits to sump 26a by means of radial outlet opening 34a in the bottom of ring gear 34. Arrows are shown in FIGS. 4 and 5 depicting the oil flow path described above.

Friction brake 16 is actuated by increasing the hydraulic fluid pressure in chamber 70 by conventional means to move the piston 64 to the left as shown in FIG. 1. Piston 64 in turn engages brake discs 56, 60 causing them to the left until they engage reaction plate 71 on carrier 40. The friction lined outer surfaces of rotatable brake discs 60 which are rotating with sun gear 36, are then compressed between alternate brake discs 56 which are secured against rotation to the ring gear 34 and axle housing 18. The friction develped between the interfacing surfaces of non-rotatable brake discs, 56, restrains rotation of the rotatable brake discs 60 and thereby rotation of sun gear 36. This restrains rotation of axle shaft 20 splined internally to sun gear 36 as well as planetary reduction gearing 14 and wheel hub 26. The braking action applied to planetary reduction gearing 14 and wheel hub 26 is independently of axle shaft 20. When the hydraulic pressure is released in chamber 70, piston 56 returns to its inner position by means of seals 100, 104 thereby allowing brake discs 56, 60 to the right relative to ring gear carrier 40 to release brake 16.

From the foregoing description, it is apparent that planetary gear carrier 40 cooperates with wheel hub 26 to provide an enclosed housing for the final drive planetary gear unit 14, multiple disc friction brake 16, and inner and outer wheel bearings 28 and 44 to enable those components as well as the outer end of the axle shaft 20 to be subject to the action of a common pool of lubricant. An oil seal 112 is retained in wheel hub 26 outwardly of inboard bearing 28 and is in annualar contact with the exterior surface of spindle 22. Seal 112 effectively precludes loss of oil between wheel hub 26 and the exterior of spindle 22. Another seal 114 is retained in the inner end of spindle 22 and is in annular contact with the exterior surface of axle shaft 20. Seal 114 effectively precludes loss of oil between spindle 22 and axle shaft 20. Experience has shown that there is no significant flow of lubricant to the hollow axle housing 18. Thus, when the brake and final drive assembly of the present invention is completed, a suitable quantity of the recommended lubricant may be introduced through a drain and fill port (now shown) which would be provided in wheel hub 26 for filling sump 26a.

Although the foregoing description has been generally directed to providng a final drive axle outer end for a wheeled vehicle the output member could provide a sprocket drive for a track vehicle as well as a wheel hub.

Having thus described a preferred embodiment of the present invention, it should be understood that the invention is not to be limited to the specific construction and arrangement shown. It will be apparent to those skilled in the art that modifications or alterations may be made without departing from the spirit and scope of the invention as set forth in the claims.

What is claimed is:

1. In an axle outer end assembly comprising
a stationary axle housing
a non-rotatable spindle connected to said axle housing having a central opening
an input member projecting from said spindle central opening, an output member surrounding said input member having an inner end rotatably mounted on said spindle and an open outer end, a planetary drive unit operably connecting said input and output members, said planetary drive unit including a one-piece ring gear fixed to said spindle having longitudinally extending internal gear teeth, a sun gear non-rotatably mounted on said input member having longitudinally extending external gear teeth, a plurality of pinion gears in meshing engagement wih a first portion of said internal and external teeth at one end of said ring and sun gear and a carrier secured to the output member open end rotatably supporting said plurality of pinion gears, a disc brake operably connecting said ring and sun gears comprising a first plurality of axially movable stationary discs having external teeth engaging a second portion of said internal teeth at the other end of said ring gear, a second plurality of axially movable rotatable discs interleaved between said first discs having internal teeth engaging said external teeth at the other end of said sun gear and a piston operative in a first position to move said discs into frictional contact with one another and into engagement with said carrier whereby said sun gear and output member are restrained against rotation, and operative in a second position to allow said discs to move out of frictional contact with one another whereby said sun gear and output member are rotatable relative to each other, an improvement comprising a stepped recess in said ring gear, an adapter connected to said spindle, said ring gear stepped recess and said adapter defining a chamber for receiving said disc brake piston and first passages in said spindle and adapter for communicating with said chamber for supplying pressure to said chamber for moving said piston to said first position for engaging said first and second discs and exhausting pressure from said chamber for moving said piston to said second position for disengaging said first and second discs.

2. An axle outer end assembly as defined in claim 1 wherein said ring gear stepped recess includes an axially extending outer wall and a connecting radially extending inner wall, said adapter including an axially extending outer wall radially spaced from said stepped recess axially extending outer wall, wherein said walls cooperate to form said chamber.

3. An axle outer end assembly as defined in claim 2 wherein said chamber and brake piston are annular.

4. An axle outer end assembly as defined in claim 1 comprising second passages in said spindle and adapter communicating with said chamber for bleeding air from said chamber.

5. An axle outer end assembly as defined in claim 3 comprising second passages in said spindle and adapter communicating with said chamber for bleeding air from said chamber.

6. An axle outer end assembly as defined in claim 4 further comprising a tube connected to said second passages extending radially outwardly into said chamber.

7. An axle outer end assembly as defined in claim 1 wherein said spindle and adapter have abutting opposed inner faces.

8. An axle outer end assembly as defined in claim 7 further comprising sealing means between said spindle and adapter inner faces.

9. An axle outer end assembly as defined in claim 8 wherein said sealing means comprises an annular groove in one of said spindle and adapter inner faces and an annular seal disposed in said annular groove.

10. An axle outer end assembly as defined in claim 1 further comprising sealing means in said ring gear stepped recess and on said adapter for engaging said brake piston, said sealing means being of sufficient elasticity to deform when pressure is supplied to move said piston to its first position and revert to its original shape when pressure is exhausted causing said sealing means to assist in moving said piston to its second piston.

11. An axle outer end assembly as defined in claim 10 wherein said sealing means comprises an outer annular seal located in a groove provided in said ring gear recess axial inner wall and an inner annular seal located in a groove provided in said adapter axial outer wall.

12. An axle outer end assembly as defined in claim 1 wherein said adapter further comprises an annular rim extending radially outwardly into said chamber, said annular rim having an inner face adapted to engage said piston and limit travel thereof when pressure is exhausted from said chamber.

13. An axle having an outer end assembly comprising a stationary axle housing, a non-rotatable spindle having a central opening, said spindle connected to said axle housing, an input member positioned in said spindle central opening, an output member having an inner end rotatably mounted on said spindle, a planetary drive assembly operably connecting said input and output members, said planetary drive assembly including a ring gear fixed to said spindle, a sun gear rigidly mounted on said input member, a plurality of pinion gears in meshing engagement with said ring gear and said sun gear, and a carrier rotatably supporting said plurality of pinion gears, said carrier secured to said output member, a disc brake assembly for selectively connecting said ring gear and said sun gear, said brake assembly comprising a first plurality of axially movable stationary discs drivingly engaging said ring gear, a second plurality of axially movable rotatable discs interleaved between said first discs, said second plurality of discs drivingly engaging said sun gear, and a piston movable into a first position wherein said first and second plurality of discs frictionally engage one another and said carrier, whereby said sun gear and said carrier are restrained against rotation, and movable into a second position wherein said discs are frictionally disengaged with one another, whereby said sun gear and said carrier are rotatable relative to said ring gear, an improvement comprising an adapter connected to said spindle, said ring gear and said adapter defining a chamber for receiving said disc brake piston and first passages in said spindle and adapter for communicating with said chamber for supplying pressure to said chamber for moving said piston to said first position for engaging said first and second discs and for exhausting pressure from said chamber for moving said piston to said second position for disengaging said first and second discs.

14. An axle outer end assembly as defined in claim 13 wherein said ring gear has a stepped recess including an axial outer wall and a connecting radial inner wall, said adapter including an axial outer wall radially spaced from said stepped recess axial outer wall, wherein said walls cooperate to form said chamber.

15. An axle outer end assembly as defined in claim 14 wherein said chamber and brake piston are annular.

16. An axle outer end assembly as defined in claim 13 comprising second passages in said spindle and adapter communicating with said chamber for bleeding air from said chamber.

* * * * *